United States Patent
Miura et al.

(10) Patent No.: US 10,814,879 B2
(45) Date of Patent: Oct. 27, 2020

(54) DETERMINATION APPARATUS AND VEHICLE

(71) Applicant: HONDA MOTOR CO., LTD., Tokyo (JP)

(72) Inventors: Hiroshi Miura, Wako (JP); Daisuke Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 166 days.

(21) Appl. No.: 15/999,031

(22) Filed: Aug. 20, 2018

(65) Prior Publication Data
US 2019/0077407 A1 Mar. 14, 2019

(30) Foreign Application Priority Data

Sep. 8, 2017 (JP) .................................. 2017-173209

(51) Int. Cl.
*B60W 40/06* (2012.01)
*G06K 9/00* (2006.01)
*B60W 30/14* (2006.01)

(52) U.S. Cl.
CPC .......... *B60W 40/06* (2013.01); *B60W 30/146* (2013.01); *G06K 9/00791* (2013.01); *G06K 9/00805* (2013.01); *B60W 2552/00* (2020.02)

(58) Field of Classification Search
None
See application file for complete search history.

(56) References Cited

U.S. PATENT DOCUMENTS

| 5,530,651 A * | 6/1996 | Uemura ................. G01S 15/86 701/301 |
| 9,234,618 B1 * | 1/2016 | Zhu ....................... G05D 1/0088 |
| 2011/0010045 A1 * | 1/2011 | Yopp ..................... B60S 1/0818 701/36 |
| 2013/0013163 A1 | 1/2013 | Hong |
| 2015/0117715 A1 * | 4/2015 | Murao ..................... G06K 9/38 382/104 |
| 2015/0166062 A1 * | 6/2015 | Johnson ................ B60W 10/20 701/41 |

(Continued)

FOREIGN PATENT DOCUMENTS

| JP | 2006-003995 A | 1/2006 |
| JP | 2013-014311 A | 1/2013 |
| JP | 2017-140981 A | 8/2017 |

OTHER PUBLICATIONS

Japanese Office Action (w/ partial translation) issued for Japanese Patent Application No. 2017-173209 dated Apr. 19, 2019.

*Primary Examiner* — Kenny S Lin
(74) *Attorney, Agent, or Firm* — Thomas Horstemeyer, LLP (57) ABSTRACT

An onboard determination apparatus, comprising a first acquisition unit configured to acquire peripheral information of a self-vehicle detected by a first sensor, a second acquisition unit configured to acquire peripheral information of the self-vehicle detected by a second sensor of a type different from the first sensor, and a determination unit configured to determine a type of an on-road raised object on the periphery of the self-vehicle based on both the peripheral information acquired by the first acquisition unit and the peripheral information acquired by the second acquisition unit.

10 Claims, 5 Drawing Sheets

(56) References Cited

U.S. PATENT DOCUMENTS

| | | | |
|---|---|---|---|
| 2015/0203107 A1* | 7/2015 | Lippman | B60W 30/16 |
| | | | 701/23 |
| 2016/0339959 A1* | 11/2016 | Lee | B60W 30/12 |
| 2018/0060674 A1* | 3/2018 | Zhao | G06K 9/6293 |
| 2018/0141563 A1* | 5/2018 | Becker | G06K 9/00791 |
| 2018/0178786 A1* | 6/2018 | Takaki | G08G 1/166 |
| 2018/0229587 A1* | 8/2018 | Gao | G01K 13/00 |
| 2018/0300898 A1* | 10/2018 | Eshima | H04N 13/246 |
| 2019/0129036 A1* | 5/2019 | Valouch | G01S 7/4816 |

* cited by examiner

DETERMINATION APPARATUS AND VEHICLE

BACKGROUND OF THE INVENTION

Field of the Invention

The present invention relates to an onboard determination apparatus.

Description of the Related Art

Japanese Patent Laid-Open No. 2013-14311 describes, as one type of automated driving technique, determining whether a road surface is in a state wet with rain or snow or not and adjusting the distance to a preceding vehicle based on the result of the determination.

A vehicle having an automated driving function generally includes a sensor configured to acquire peripheral information of a self-vehicle. When traveling on a road surface wet with rain or snow, an on-road raised object (so-called ghost) sometimes occurs. This may adhere dirt to the sensor, and the detection performance of the sensor may deteriorate. Since the influence of the on-road raised object on the sensor changes depending on the type of the on-road raised object, a technique of appropriately determining the type is required.

SUMMARY OF THE INVENTION

The present invention enables determination of the type of an on-road raised object.

One of the aspects of the present invention provides an onboard determination apparatus, comprising a first acquisition unit configured to acquire peripheral information of a self-vehicle detected by a first sensor, a second acquisition unit configured to acquire peripheral information of the self-vehicle detected by a second sensor of a type different from the first sensor, and a determination unit configured to determine a type of an on-road raised object on the periphery of the self-vehicle based on both the peripheral information acquired by the first acquisition unit and the peripheral information acquired by the second acquisition unit.

Further features of the present invention will become apparent from the following description of exemplary embodiments with reference to the attached drawings.

DESCRIPTION OF THE EMBODIMENTS

Embodiments of the present invention will now be described with reference to the accompanying drawings. Note that the drawings are schematic views showing structures or arrangements according to the embodiments, and the dimensions of members shown in the drawings do not necessarily reflect the actuality. In addition, the same reference numerals denote the same members or the same constituent elements in the drawings, and a description of repetitive contents will be omitted.

First Embodiment

Figure 1:
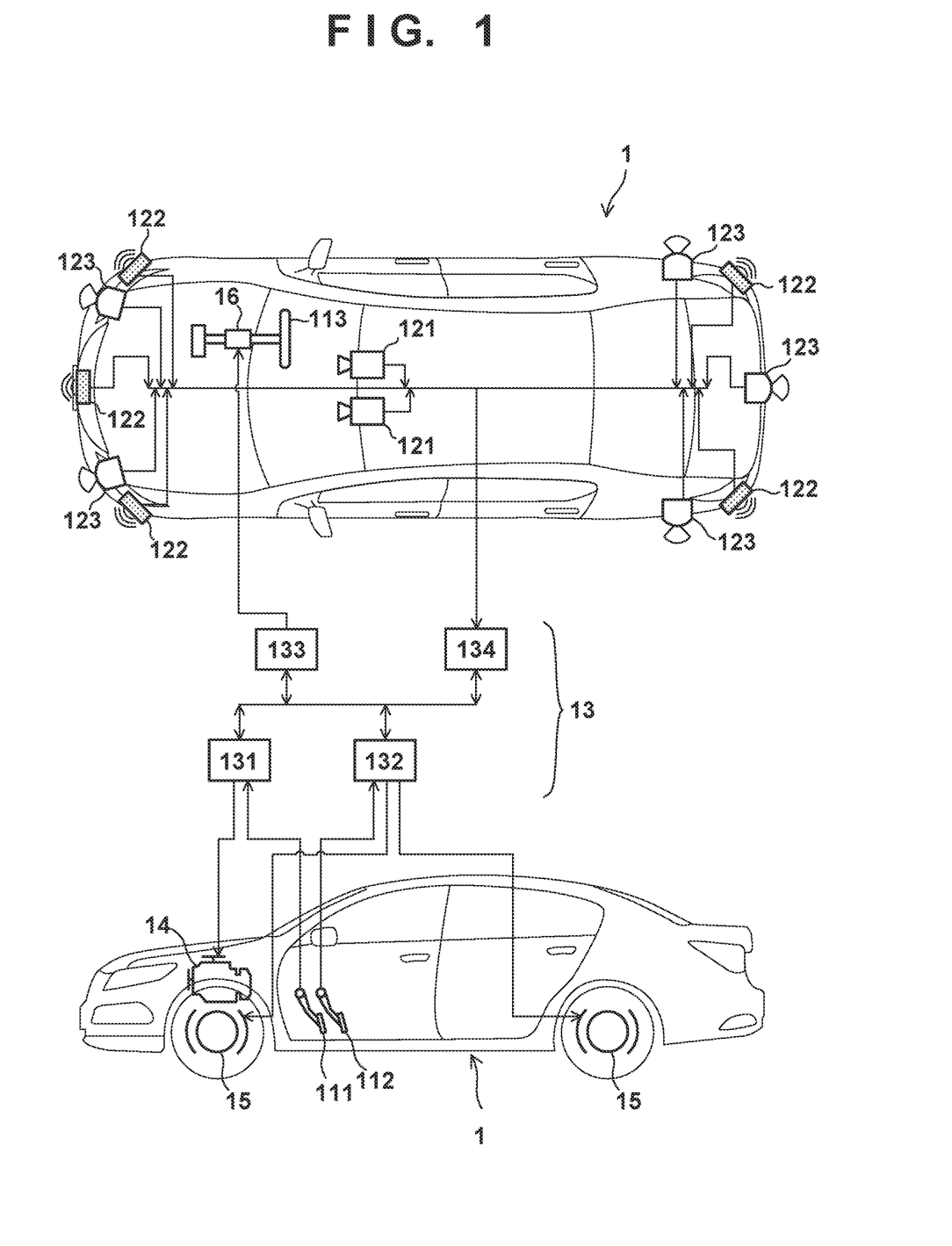
FIG. 1 is a view for explaining an example of the arrangement of a vehicle.
Figure 2:
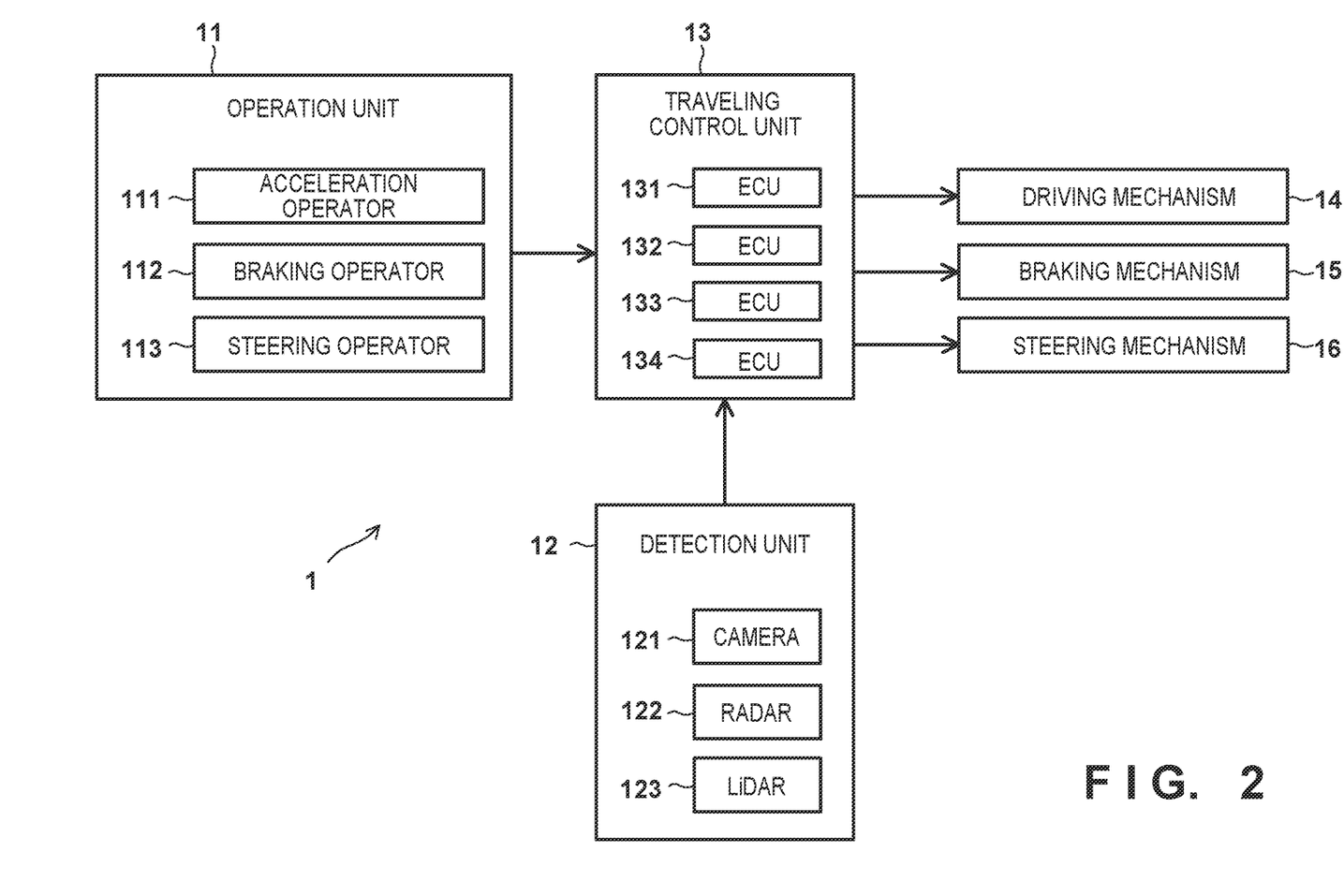
FIG. 2 is a block diagram for explaining an example of the arrangement of the vehicle.

FIGS. 1 and 2 are views for explaining the arrangement of a vehicle 1 according to the first embodiment. FIG. 1 shows the arrangement positions of elements to be described below and the connection relationship between the elements using a plan view and a side view of the vehicle 1. FIG. 2 is a system block diagram of the vehicle 1.

In the following explanation, expressions such as front/rear, upper/lower, and left/right (lateral) are sometimes used. These are used as expressions indicating relative directions based on the vehicle body of the vehicle 1. For example, "front" indicates the front in the longitudinal direction of the vehicle body, and "upper" indicates the height direction of the vehicle body.

The vehicle 1 includes an operation unit 11, a detection unit 12, a traveling control unit 13, a driving mechanism 14, a braking mechanism 15, and a steering mechanism 16. In this embodiment, the vehicle 1 is a four-wheeled vehicle. However, the number of wheels is not limited to this.

The operation unit 11 includes an acceleration operator 111, a braking operator 112, and a steering operator 113. Typically, the acceleration operator 111 is an accelerator pedal, the braking operator 112 is a brake pedal, and the steering operator 113 is a steering wheel. However, another type such as a lever type or a button type may be used for the operators 111 to 113.

The detection unit 12 includes cameras 121, radars 122, and LiDARs (Light Detection and Ranging) 123, all of which function as sensors configured to detect the peripheral information of the vehicle (self-vehicle) 1. The camera 121 is, for example, an image capturing device using a CCD image sensor, a CMOS image sensor, or the like. The radar 122 is, for example, a distance measuring device such as a millimeter-wave radar. The LiDAR 123 is, for example, a distance measuring device such as a laser radar. These devices are arranged at positions where peripheral information of the vehicle 1 can be detected, for example, on the front side, rear side, upper side, and lateral sides of the vehicle body, as shown in FIG. 1.

The peripheral information of the above-described vehicle 1 is information indicating under what kind of situation the vehicle 1 is traveling. The peripheral information of the vehicle 1 indicates, for example, the traveling environment information (the extending direction of a lane, a traveling enable region, the color of a traffic light, and the like) of the vehicle 1, object information (the presence/absence of an object such as another vehicle, a walker, or an obstacle, and the attribute, the position, the moving direction, and the speed of the object, and the like) on the periphery of the vehicle 1, and the like.

The traveling control unit 13, for example, controls the mechanisms 14 to 16 based on signals from the operation unit 11 and/or the detection unit 12. The traveling control unit 13 includes a plurality of ECUs (Electronic Control Units) 131 to 134. Each ECU includes a CPU, a memory, and a communication interface. Each ECU performs predetermined processing by the CPU based on information (data or an electrical signal) received via the communication interface, and stores the processing result in the memory or outputs the processing result to another element via the communication interface.

In this embodiment, the ECU 131 is an acceleration ECU and, for example, controls the driving mechanism 14 based on the operation amount of the acceleration operator 111 by a driver. The driving mechanism 14 includes, for example, an internal combustion engine and a transmission. The ECU 132 is a braking ECU and, for example, controls the braking mechanism 15 based on the operation amount of the braking operator 112 by the driver. The braking mechanism 15 is, for example, a disc brake provided on each wheel. The ECU 133 is a steering ECU and, for example, controls the steering mechanism 16 based on the operation amount of the steering operator 113 by the driver. The steering mechanism 16 includes, for example, a power steering.

The ECU 134 is a detection ECU and, for example, performs predetermined processing upon receiving the peripheral information of the vehicle 1 detected by the detection unit 12 and outputs the processing result to the ECUs 131 to 133. The ECUs 131 to 133 can also control the mechanisms 14 to 16 based on the processing result from the ECU 134. With this arrangement, the vehicle 1 can perform automated driving based on the detection result (the peripheral information of the vehicle 1) by the detection unit 12.

In this specification, automated driving means partially or wholly performing the driving operation (acceleration, braking, and steering) not on the driver side but on the side of the traveling control unit 13. That is, the concept of automated driving includes a form (so-called full automated driving) in which the driving operation is wholly performed on the side of the traveling control unit 13 and a form (so-called driving support) in which only part of the driving operation is performed on the side of the traveling control unit 13. Examples of driving support are a vehicle speed control (automatic cruise control) function, a following distance control (adaptive cruise control) function, a lane departure prevention support (lane keep assist) function, a collision avoidance support function, and the like.

Note that the traveling control unit 13 is not limited to this arrangement. For example, a semiconductor device such as an ASIC (Application Specific Integrated Circuit) may be used in each of the ECUs 131 to 134. That is, the functions of the ECUs 131 to 134 can be implemented by either hardware or software. In addition, some or all of the ECUs 131 to 134 may be formed by a single ECU. In addition, the traveling control unit 13 may be simply expressed as "control unit".

By the way, in general, when a vehicle travels on a road surface, a relatively small object may be raised in a mist form (or may be expressed as "smoke form") in the space on the road, and an on-road raised object may be generated. For example, when traveling on a road surface wet with rain or snow, an on-road raised object of rainwater or snow/ice may be generated. Such an on-road raised object is also called "ghost" or the like and can be detected as one object by the above-described detection unit 12 (the cameras 121, the radars 122, and the LiDARs 123).

When such an on-road raised object (or a foreign substance such as mud included in it) adheres to the detection surface or exposed surface of the detection unit 12, the detection performance of the detection unit 12 may deteriorate, and the degree of deterioration of the detection performance may change depending on the type of the on-road raised object. In addition, when the traveling control unit 13 is executing the above-described automated driving based on the detection result of the detection unit 12, since the vehicle 1 can determine the state of the road surface during traveling based on the type of the on-road raised object, the result of the determination can be used for control of the automated driving. For this reason, a technique of appropriately determining the type of the on-road raised object is demanded.

Figure 3:
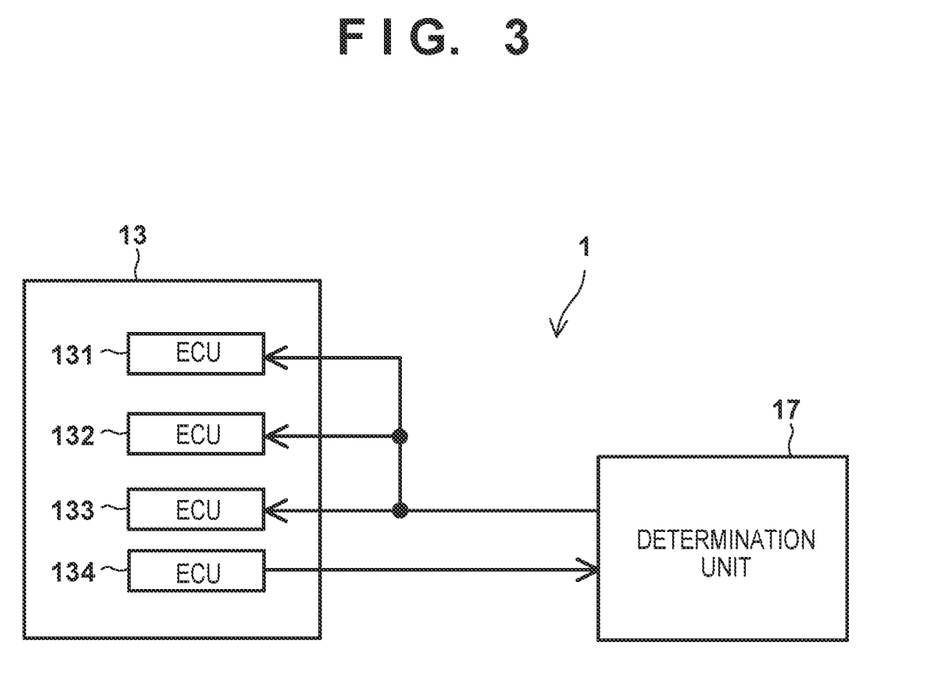
FIG. 3 is a block diagram for explaining an example of an arrangement capable of determining an on-road raised object.

As shown in FIG. 3, in this embodiment, the vehicle 1 further includes a determination unit (onboard determination apparatus) 17 configured to determine the type of an on-road raised object. The determination unit 17 can communicate with the traveling control unit 13, receives the detection result of the detection unit 12 from the ECU 134, determines the type of the on-road raised object, and outputs the result of the determination to the ECUs 131 to 133. With this arrangement, the traveling control unit 13 (each of the ECUs 131 to 133) performs automated driving based on the determination result of the determination unit 17, that is, the type of the on-road raised object.

For example, when the on-road raised object is determined as snow/ice by the determination unit 17, the traveling control unit 13 may perform, in automated driving, control different from that in a normal state (for example, in fine weather or in a case in which it does not rain or snow) or in rainy weather. As an example, the traveling control unit 13 may limit the vehicle speed of the vehicle 1, for example, set the vehicle speed a little lower than in the normal state and perform automated driving. This can prevent snow/ice raised by the vehicle 1 itself or a preceding vehicle traveling ahead of the vehicle 1 from adhering to the detection unit 12.

Additionally, as another example, the traveling control unit 13 may limit the vehicle speed of the vehicle 1 such that, for example, the distance between the vehicle 1 and the preceding vehicle becomes larger than in the normal state and perform automated driving. This can prevent snow/ice raised by the preceding vehicle from adhering to the detection unit 12.

As still another example, when, for example, moving in the vehicle width direction to change the lane, the traveling control unit 13 may do this moderately (by suppressing the moving speed in the vehicle width direction) as compared to the normal state. Alternatively, the traveling control unit 13 may inhibit a lane change aiming at passing the preceding vehicle.

The above-described several examples also apply to a case in which the on-road raised object is determined as rainwater. Furthermore, control can also be performed such that the vehicle speed is lowered upon determining that the on-road raised object is rainwater, and the vehicle speed is further lowered upon determining that the on-road raised object is snow/ice.

In this embodiment, the determination unit 17 includes a CPU, a memory, and a communication interface, and determines the type of an on-road raised object by this arrangement. The function of the determination unit 17 can be implemented by either hardware or software, like the ECU 131 and the like.

Figure 4:
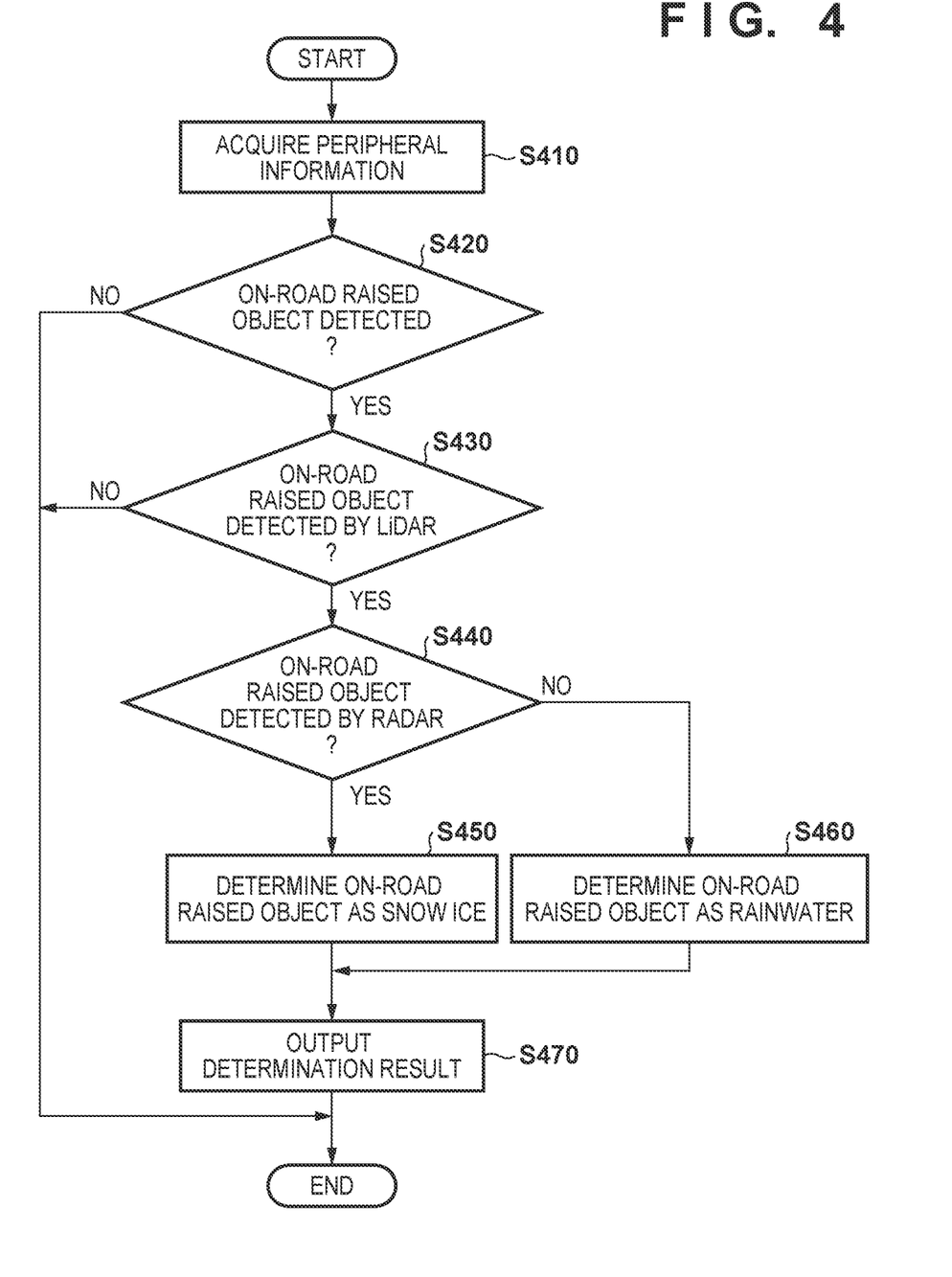
FIG. 4 is a flowchart for explaining an example of an on-road raised object determination method.

FIG. 4 is a flowchart showing a method of determining the type of the on-road raised object according to this embodiment. Each step explained in this flowchart is executed mainly by the determination unit 17. As the outline of this flowchart, the type of the on-road raised object on the periphery of the vehicle 1 is determined by considering both pieces of peripheral information detected by two different types of sensors (the radars 122 and the LiDARs 123).

First, in step S410 (to be simply referred to as "S410" hereinafter, and this also applies to the other steps), the peripheral information of the vehicle 1 is acquired. As described above, the peripheral information of the vehicle 1 indicates the traveling environment information (the extending direction of a lane, a traveling enable region, the color of a traffic light, and the like) of the vehicle 1, object information (the presence/absence of an object such as another vehicle, a walker, or an obstacle, and the attribute, the position, the moving direction, and the speed of the object, and the like) on the periphery of the vehicle 1, and the like. These are generated based on the detection result of the detection unit 12, that is, image data obtained from the cameras 121 and target information obtained from the radars 122 and the LiDARs 123.

Here, the radars 122 and the LiDARs 123 generate electromagnetic waves (projected waves) different from each other and detect waves (reflected waves) reflected by an object on the periphery of the vehicle 1, thereby acquiring target information. The concept of the electromagnetic waves includes, for example, radio waves such as a millimeter wave and a submillimeter wave, light such as visible light, infrared rays, and ultraviolet rays, radiation such as X-rays, and laser beams of various wavelengths. The electromagnetic wave of the LiDARs 123 has a shorter wavelength (higher frequency) as compared to the radars 122, and objects (targets) detectable by the radars 122 and the LiDARs 123 can be different. As a typical example, a millimeter wave (having a wavelength of several [mm] and a frequency of several hundred [GHz]) is used as the electromagnetic wave of the radars 122, and a laser beam (having a wavelength of several hundred [nm] and a frequency of several hundred [THz]) is used as the electromagnetic wave of the LiDARs 123. However, the electromagnetic waves are not limited to these.

In S420, it is determined whether the detection unit 12 detects an on-road raised object (or an object that may be an on-road raised object). If the detection unit 12 detects an on-road raised object, the process advances to S430. Otherwise, this flowchart ends. In S420, it is only necessary to determine whether an object that may be an on-road raised object is detected, and the target of the detection determination need not always be an on-road raised object. In this embodiment, when some or at least one of the cameras 121, the radars 122, and the LiDARs 123 detects the object that may be an on-road raised object, the process advances to S430.

For example, in a case of the cameras 121, the determination can be implemented by performing known image analysis such as pattern matching for image data obtained by the cameras 121. If, as the result of analysis of the image data, for example, an object in a mist form exists in a predetermined region above the road surface or within a predetermined range behind the preceding vehicle, it can be said that an on-road raised object is generated in that region. Note that cases of the radars 122 and the LiDARs 123 will be described later.

In S430, it is determined whether the LiDARs 123 detect an on-road raised object (or an object that may be an on-road raised object). If the LiDARs 123 detect an on-road raised object, the process advances to S440. Otherwise, this flowchart ends. This determination is done based on the target information obtained by the LiDARs 123. For example, if the detection result of the LiDARs 123 includes information representing a clutter (a noise component corresponding to a reflected wave by rain or the like), it can be said that an on-road raised object is generated in that region. Additionally, in a case in which, for example, it is determined in S420 by the cameras 121 that an on-road raised object is generated, and the target information represents that an object having the same shape as the on-road raised object exists in the region, it can be said that an on-road raised object is generated in that region.

In S440, it is determined whether the radars 122 detect an on-road raised object (or an object that may be an on-road raised object). If the radars 122 detect an on-road raised object, the process advances to S450. Otherwise, the process advances to S460. This determination is done based on the target information obtained by the radars 122, as in S430.

As described above, the electromagnetic wave of the LiDARs 123 has a shorter wavelength (higher frequency) as compared to the radars 122, and objects (targets) detectable by the radars 122 and the LiDARs 123 can be different. For this reason, depending on the type of the on-road raised object, a case in which the detection result of the radars 122 and the detection result of the LiDARs 123 are the same and a case in which they are different can occur. For example, if the on-road raised object is snow/ice, both the radars 122 and the LiDARs 123 can detect this. On the other hand, if the on-road raised object is rainwater, the LiDARs 123 of the radars 122 and the LiDARs 123 can detect this.

Hence, in S450, the on-road raised object is determined as snow/ice, and in S460, the on-road raised object is determined as rainwater. After that, in S470, the determination result is output to the traveling control unit 13 (ECUs 131 to 133). Based on the determination result, the traveling control unit 13 can perform the above-described automated driving, for example, adjust the distance between the vehicle 1 and the preceding vehicle or decide whether to change the lane.

According to this embodiment, in S410, the determination unit 17 acquires the peripheral information of the vehicle 1 detected by the radars 122 and acquires the peripheral information of the vehicle 1 detected by the LiDARs 123. In S430 to S460, the type of the on-road raised object on the periphery of the vehicle 1 is determined based on both the detection result of the radars 122 and the detection result of the LiDARs 123. That is, according to this embodiment, it is possible to determine the type of the on-road raised object by considering both pieces of peripheral information detected by the two different types of sensors.

The two types of sensors need only use methods different from each other as the method of detecting the vehicle 1. In this embodiment, a form in which the type (rainwater or snow/ice) of the on-road raised object is determined using the radars 122 (capable of detecting snow/ice) and the LiDARs 123 (capable of detecting both rainwater and snow/ice) which generate electromagnetic waves of different wavelengths has been exemplified. However, the present invention is not limited to this. As an example, the type of the on-road raised object can also be determined using the cameras 121 (capable of detecting both rainwater and snow/ice) in place of the LiDARs 123, that is, using the cameras 121 and the radars 122. Alternatively, as another example, the type (also including a type different from rainwater and snow/ice) of the on-road raised object can also be determined further using another radar whose electromagnetic wave has a wavelength different from those of both the radars 122 and the LiDARs 123. That is, various types of sensors can be selected as the above-described two types of sensors.

In this embodiment, in response to detection of an on-road raised object (or an object that may be an on-road raised object) by the detection unit 12, determination of the type is performed based on the detection results of the radars 122 and the LiDARs 123 (see S420). However, the determination method is not limited to this form and can be modified variously. For example, the determination method may be set such that the determination starts upon detection by the LiDARs 123. That is, S420 may be omitted.

Additionally, in this embodiment, the cameras 121 are arranged to be able to capture the state ahead of the vehicle 1. Accordingly, the cameras 121 can detect an on-road raised object by the preceding vehicle. For this reason, in S420, for example, when the cameras 121 detect the on-road raised object by the preceding vehicle, determination of the type can be performed in response to this. In general, an on-road raised object raised by a traveling vehicle is generated behind the vehicle, and the range of diffusion of the on-road raised object can change depending on the traveling state (the vehicle speed, the turning angle, and the like) of the vehicle. Hence, in S420, the on-road raised object may be detected with focus on a predetermined region behind the preceding vehicle. At this time, the range to focus may be set based on the traveling state of the preceding vehicle. This can improve the detection accuracy of the on-road raised object. This also applies to the cases of the radars 122 and the LiDARs 123.

Furthermore, according to this embodiment, the type of the on-road raised object can be determined based on the detection results of the radars 122 and the LiDARs 123 (without referring to the detection result of the cameras 121). For this reason, even if other cameras 121 capable of detecting an on-road raised object raised by the vehicle 1 itself are not further arranged, the type of the on-road raised object raised by the vehicle 1 itself can be determined based on the detection results of the radars 122 and the LiDARs 123. Hence, according to this embodiment, even if a preceding vehicle does not exist ahead of the vehicle 1, appropriate automated driving can be implemented. Alternatively, as another embodiment, to detect the on-road raised object raised by the vehicle 1 itself, other cameras 121 and, additionally, other radars 122 and other LiDARs 123 may be further arranged on the periphery of the wheels of the vehicle 1. In this case, the steps from S430 may be performed in response to detection of the on-road raised object by at least the other cameras 121. This makes it possible to appropriately prevent erroneous determination of the type of the on-road raised object or erroneous detection of the on-road raised object itself.

Second Embodiment

In the above-described first embodiment, the type of an on-road raised object is determined using two types of sensors. The accuracy of the determination can be improved further using other types of sensors. As the other types of sensors, for example, sensors configured to detect the peripheral environment of a vehicle 1 such as a temperature (atmospheric temperature) or humidity outside the vehicle can be used.

Figure 5:
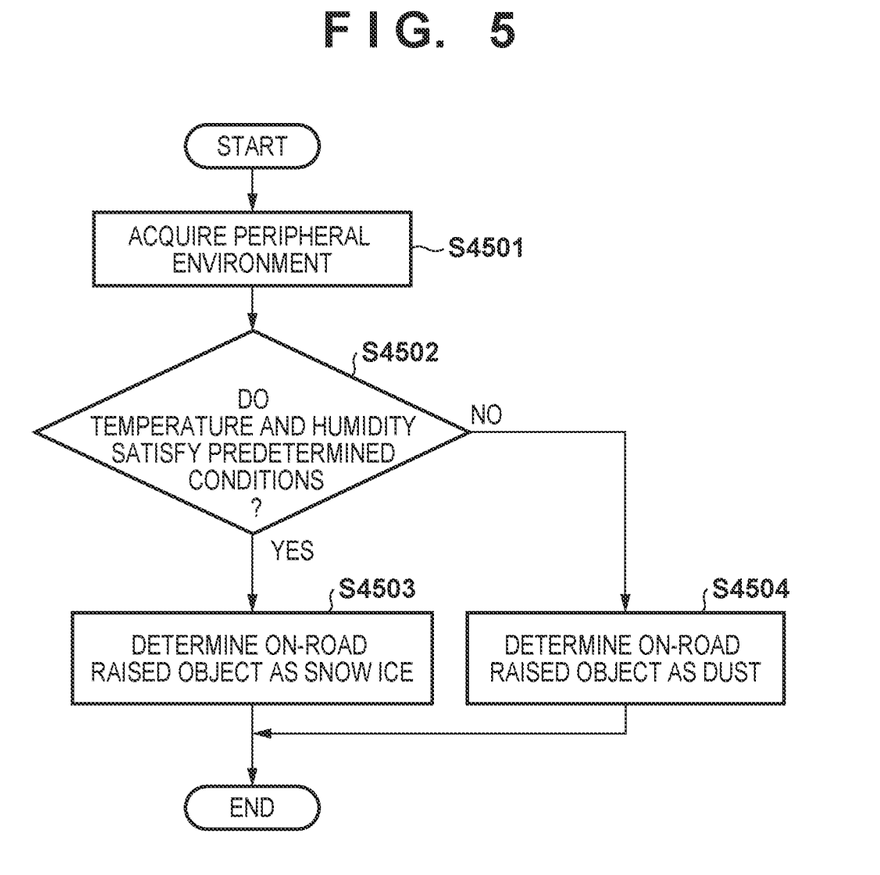
FIG. 5 is a flowchart for explaining an example of an on-road raised object determination method.

FIG. 5 is a flowchart showing part of determination contents according to the second embodiment. In this embodiment, S4501 to S4504 are performed in place of S450 of the determination method according to the first embodiment (see FIG. 4), and the remaining steps are the same as in the first embodiment. As the outline of this flowchart, the type of an on-road raised object is determined further based on the peripheral environment of the vehicle 1 such as the temperature or humidity outside the vehicle.

In S4501, the peripheral environment of the vehicle 1 is acquired. This can be implemented by, for example, providing, outside the vehicle 1, a temperature sensor capable of detecting the temperature outside the vehicle and a humidity sensor capable of detecting the humidity outside the vehicle.

In S4502, it is determined, based on the peripheral environment acquired in S4501, whether each of the temperature and the humidity satisfies a predetermined condition. If the temperature and the humidity satisfy the predetermined conditions, the process advances to S4503. Otherwise, the process advances to S4504. As the predetermined conditions, conditions corresponding to a snowfall condition or a snow accumulation condition are set. For example, the temperature can be set to 10° C. or less, and the humidity can be set to 60% or less.

In S4503, since it is determined in S4502 that the temperature and the humidity satisfy the conditions corresponding to the snowfall condition or the snow accumulation condition, the type of the on-road raised object detected in S420 to S440 (see FIG. 4) is determined as snow/ice. On the other hand, in S4504, since it is determined in S4502 that the temperature and the humidity do not satisfy the conditions, the type of the on-road raised object is determined as, for example, dust.

In this embodiment, the atmospheric temperature and the humidity outside the vehicle have been exemplified as the peripheral environment of the vehicle 1 obtained in S4501. In the determination of S4502, however, one of the atmospheric temperature and the humidity may be referred to. In addition, since the dust exemplified in S4504 is readily raised as the humidity lowers, a condition to determine the on-road raised object as dust may be provided independently of the predetermined conditions in S4502. As another embodiment, the wind velocity may be further referred to. Alternatively, past weather information only in a predetermined period (for example, 1 hr) before the timing of the determination in S4502 may be further referred to.

Summary of Embodiments

The first aspect is directed to an onboard determination apparatus (for example, 17), and the determination apparatus comprises a first acquisition unit (for example, 17, S410) configured to acquire peripheral information of a self-vehicle (for example, 1) detected by a first sensor (for example, 122, 123), a second acquisition unit (for example, 17, S410) configured to acquire peripheral information of the self-vehicle detected by a second sensor (for example, 122, 123) of a type different from the first sensor, and a determination unit (for example, 17, S430-S460) configured to determine a type of an on-road raised object on the periphery of the self-vehicle based on both the peripheral information acquired by the first acquisition unit and the peripheral information acquired by the second acquisition unit.

According to the first aspect, it is possible to determine the type of the on-road raised object on the periphery of the self-vehicle by considering both pieces of peripheral information detected by the two types of sensors. Note that the on-road raised object as the determination target includes an on-road raised object by the self-vehicle itself and an on-road raised object by another vehicle (for example, a preceding vehicle) on the periphery of the self-vehicle.

In the second aspect, when one of the peripheral information acquired by the first acquisition unit and the peripheral information acquired by the second acquisition unit indicates existence of the on-road raised object, the determination unit determines the on-road raised object as rainwater (for example, S460), and when both the peripheral information acquired by the first acquisition unit and the peripheral information acquired by the second acquisition unit indicate the existence of the on-road raised object, the determination unit determines the on-road raised object as snow/ice (for example, S450).

As the types of the on-road raised object, snow/ice and rainwater can be considered. According to the second aspect, these can be distinguished.

In the third aspect, the determination unit determines the type of the on-road raised object further based on a peripheral environment of the self-vehicle (for example, S4501-S4504).

According to the third aspect, it is possible to improve the accuracy of determination of the type of the on-road raised object.

In the fourth aspect, the peripheral environment of the self-vehicle includes a temperature and/or a humidity outside the self-vehicle (for example, S4502).

According to the fourth aspect, it is possible to improve the accuracy of the determination. For example, if the temperature is relatively high, and the humidity is relatively low, it can be determined that the on-road raised object is not snow/ice but dust.

The fifth aspect is directed to a vehicle (for example, 1), the vehicle is a vehicle comprising a determination apparatus (for example, 17), and a control unit (for example, 13) configured to perform a driving operation of a self-vehicle, and the control unit performs the driving operation based on a determination result of a determination unit.

According to the fifth aspect, the determination apparatus can be applied to a vehicle having an automated driving function, and the automated driving function can appropriately be implemented.

In the sixth aspect, the control unit performs the driving operation to limit a vehicle speed of the self-vehicle based on the determination result of the determination unit.

According to the sixth aspect, for example, control can also be performed such that the vehicle speed is lowered if the type of the on-road raised object is rainwater, and the vehicle speed is further lowered if the type of the on-road raised object is snow/ice, and the contents of automated driving can be changed in accordance with the type of the on-road raised object.

In the seventh aspect, the control unit performs the driving operation to limit a movement in a vehicle width direction of the self-vehicle based on the determination result of the determination unit.

According to the seventh aspect, the contents of automated driving can be changed in accordance with the type of the on-road raised object. For example, for snow/ice (or rainwater), control can be performed such that the lane change is suppressed, or the lane change is performed moderately as compared to a normal state.

In the eighth aspect, the vehicle further comprises a first sensor (for example, 122) and a second sensor (for example, 123), the first sensor can detect a target using a first electromagnetic wave, the second sensor can detect a target using a second electromagnetic wave whose wavelength is shorter than a wavelength of the first electromagnetic wave, when an on-road raised object is detected as the target by the second sensor of the first sensor and the second sensor, the determination unit determines the on-road raised object as rainwater (for example, S430), and when the on-road raised object is detected as the target by both the first sensor and the second sensor, the determination unit determines the on-road raised object as snow/ice (for example, S440).

According to the eighth aspect, the type of the on-road raised object can appropriately be determined.

In the ninth aspect, the vehicle further comprises an image capturing sensor (for example, 121), and the determination unit determines a type of an on-road raised object in response to detection of the on-road raised object by the image capturing sensor (for example, S420).

According to the ninth aspect, since the on-road raised object can be detected even by the image capturing sensor such as a camera, the type of the on-road raised object can be determined in response to detection of the on-road raised object by the image capturing sensor. This prevents erroneous determination of the type of the on-road raised object or erroneous detection of the on-road raised object itself.

In the 10th aspect, the determination unit determines a type of an on-road raised object raised by a preceding vehicle traveling ahead of the self-vehicle.

According to the 10th aspect, it is possible to detect the on-road raised object raised by the preceding vehicle and adjust (for example, increase) the distance to the preceding vehicle based on the type.

In the 11th aspect, the determination unit determines the type of the on-road raised object existing within a predetermined region that is located behind the preceding vehicle and is set based on a traveling state of the preceding vehicle.

In general, an on-road raised object raised by a traveling vehicle is generated behind the vehicle, and the range of diffusion of the on-road raised object can change depending on the state (the vehicle speed, the turning angle, and the like) of the vehicle. Hence, according to the 11th aspect, the type of the on-road raised object in the region set in consideration of the state of the preceding vehicle is determined. This can improve the detection accuracy of the on-road raised object.

In the 12th aspect, the determination unit determines a type of an on-road raised object raised by the self-vehicle.

According to the 12th aspect, it is possible to determine the type of the on-road raised object from the traveling surface even if the preceding vehicle does not exist.

Other Embodiments

Several preferred embodiments have been described above. However, the present invention is not limited to these examples and may partially be modified without departing from the scope of the invention. For example, other elements may be combined with the contents of the embodiments in accordance with the object, application purpose, and the like, and the contents of a certain embodiment may be combined with part of the contents of another embodiment. In addition, individual terms described in this specification are merely used for the purpose of explaining the present invention, and the present invention is not limited to the strict meanings of the terms and can also incorporate their equivalents.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-173209, filed on Sep. 8, 2017, which is hereby incorporated by reference herein in its entirety.

What is claimed is:

1. An onboard determination apparatus comprising:
a first acquisition unit configured to acquire peripheral information using a first sensor which generates a millimeter wave as a projected wave and detects the millimeter wave as a reflected wave, the peripheral information including at least information of an object around a self-vehicle;

a second acquisition unit configured to acquire the peripheral information using a second sensor which generates a laser beam as a projected wave and detects the laser beam as a reflected wave; and a determination unit configured to determine an on-road raised object on a periphery of the self-vehicle as rainwater, when the peripheral information acquired by the first acquisition unit does not indicate existence of the on-road raised object and when the peripheral information acquired by the second acquisition unit indicates existence of the on-road raised object; and determine the on-road raised object as snow/ice, when the peripheral information acquired by both the first and second acquisition units indicates existence of the on-road raised object.

2. The apparatus according to claim 1, wherein the determination unit determines the type of the on-road raised object further based on a temperature and a humidity outside the self-vehicle.

3. A vehicle comprising:

a determination apparatus of claim 1; and a control unit configured to perform a driving operation of the self-vehicle, wherein the control unit performs, based on a determination result of a determination unit, (i) an adjustment of a vehicle speed, (ii) an adjustment of a distance between the self-vehicle and its preceding vehicle, and/or (iii) a decision whether to change a lane.

4. The vehicle according to claim 3, wherein the control unit limits the vehicle speed in a first case of determining the on-road raised object as rainwater, and further limits the vehicle speed in a second case of determining the on-road raised object as snow/ice such that the vehicle speed in the second case is lower than that in the first case.

5. The vehicle according to claim 3, wherein the control unit moves the self-vehicle in a vehicle width direction moderately in a first case of determining the on-road raised object as rainwater, and further moves the self-vehicle in the vehicle width direction moderately in a second case of determining the on-road raised object as snow/ice such that the movement in the second case is more moderate than that in the first case.

6. The vehicle according to claim 3, further comprising the first sensor and the second sensor.

7. The vehicle according to claim 3, further comprising an image capturing sensor, wherein the determination unit determines a type of an on-road raised object in response to detection of the on-road raised object by the image capturing sensor.

8. The vehicle according to claim 3, wherein the determination unit determines a type of an on-road raised object raised by a preceding vehicle traveling ahead of the self-vehicle.

9. The vehicle according to claim 8, wherein the determination unit determines the type of the on-road raised object existing within a predetermined region that is located behind the preceding vehicle and is set based on a traveling state of the preceding vehicle.

10. The vehicle according to claim 3, wherein the determination unit determines a type of an on-road raised object raised by the self-vehicle.

* * * * *